Feb. 27, 1962      C. H. HESS      3,022,830
TRACTOR DRAFT LOAD CONTROL SYSTEM
Original Filed April 22, 1957      3 Sheets-Sheet 1

INVENTOR.
C. H. HESS

INVENTOR.
C. H. HESS

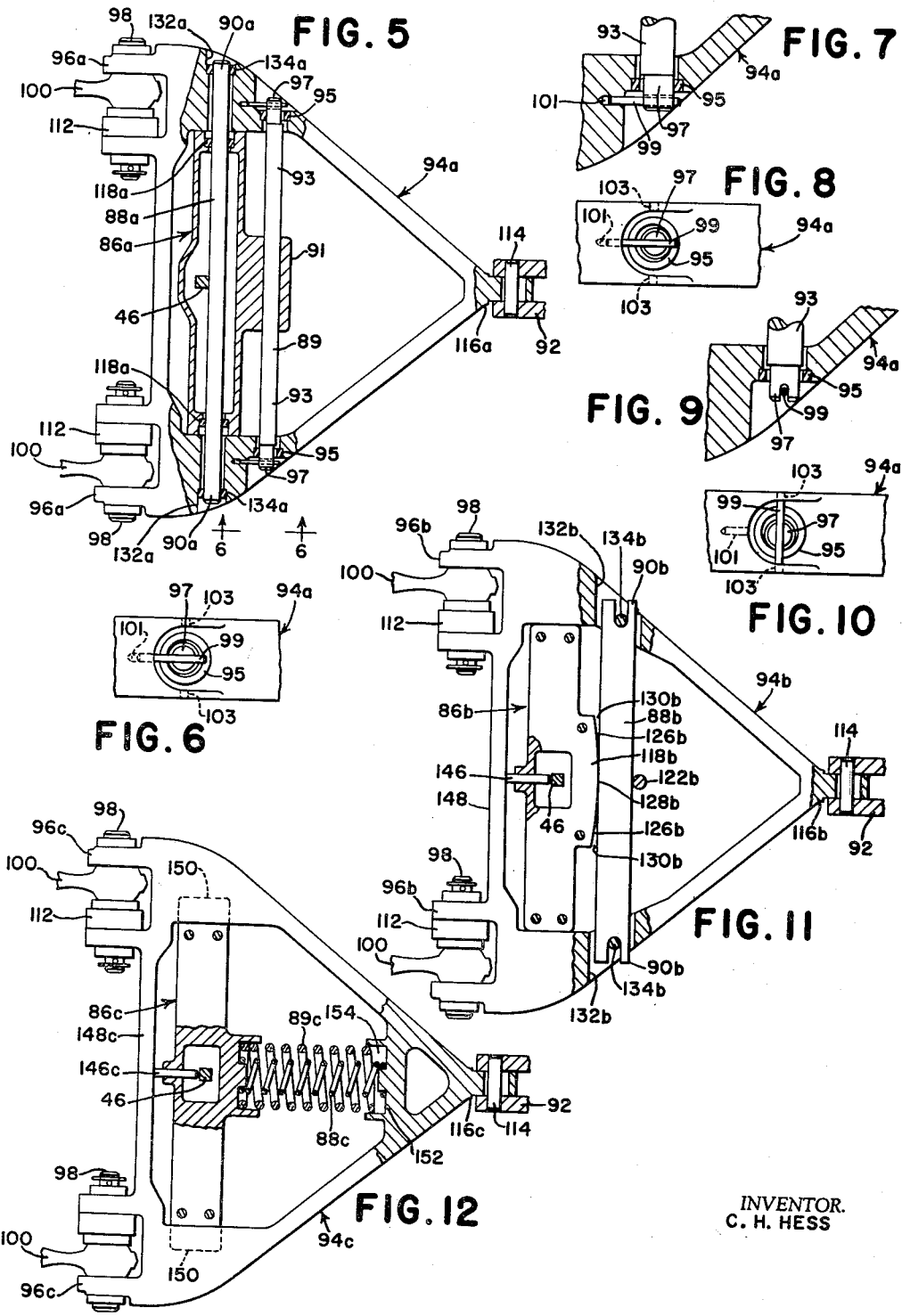

United States Patent Office

3,022,830
Patented Feb. 27, 1962

3,022,830
TRACTOR DRAFT LOAD CONTROL SYSTEM
Christian H. Hess, Waterloo, Iowa, assignor, by mesne assignments, to Deere & Company, a corporation of Delaware
Original application Apr. 22, 1957, Ser. No. 654,110. Divided and this application July 27, 1960, Ser. No. 45,674
8 Claims. (Cl. 172—7)

This invention relates to a draft load control system for tractors and associated implements and has for its principal object the provision of an improved system constituting primarily an improvement on assignee's copending application Ser. No. 513,352, filed June 6, 1955, now abandoned and replaced by Ser. No. 730,743, filed April 16, 1958, now Patent 2,940,530. This application is further a division of Ser. No. 654,110, filed April 22, 1957.

In a typical draft load control system, the tractor includes power-operated means for vertically adjusting an associated implement and the draft load between the tractor and implement is balanced by a spring or equivalent resilient device so that changes in draft load effect modification of the control for the power activated means for correctively adjusting the working position of the implement. In the copending application referred to above, the resilient means is an inherently resilient bar or beam stressible in bending by draft load between the tractor and implement, this construction being used in lieu of the conventional coil spring. In that application, the lower or draft links, which are typical of a three-point hitch linkage between the tractor and implement, are connected to the overhanging ends of the bar or beam. According to the present invention, one improvement is wrought by the interposition of a draft element connected to the bar or beam and to which the draft links are connected. This enables lateral spacing of the draft links according to different kinds of implements without affecting the effective moment arms on the overhanging ends of the beam.

A significant object of the present invention is to provide means whereby the responsiveness of the power-operated means is proportional to the draft load. This object is achieved in one preferred embodiment of the invention by means for automatically reducing the overhang on the overhanging ends of the beams so that at higher loads, a change in the load will produce a smaller change in the signal to the power-operated means than would be produced by a similar change in a lighter load range. This materially improves the sensitivity of the system and, as already indicated, makes the signal required to actuate the hydraulic system proportional to the load.

The invention features further the provision of means for interposing an additional resistance to deflection of the beam at higher loads, and in this respect it is an important object to provide adjustability between the secondary or auxiliary resistance so as to vary the time of effectiveness of the latter. Other important objects of the invention reside in the utilization of an interposed draft element to which the main and secondary resistances are connected; improved means mounting the draft element on the tractor for shifting; improved means for utilizing the connection of the draft links to the interposed element rather than directly to the beam in bending; and such other features and objects, inherent in and encompassed by the invention, as will appear from the following detailed description of preferred embodiments of the invention as disclosed in detail in the ensuing specification and accompanying sheets of drawings, the several figures of which will be described immediately below.

FIG. 5 is a section similar to FIG. 3 but showing a modified form of construction.

FIG. 6 is a fragmentary end view, on an enlarged scale, as indicated by the line 6—6 on FIG. 5.

FIG. 7 is an enlarged fragmentary sectional view showing an adjusted position of the auxiliary or secondary resistance.

FIG. 8 is an end view of the same.

FIG. 9 shows a still further adjusted position of the auxiliary resistance.

FIG. 10 is an end view of the same.

FIG. 11 is a view similar to FIGS. 3 and 5 but showing a further modified form of construction.

FIG. 12 is a view similar to FIGS. 3, 5 and 11 but showing a still further modified form of construction.

Figure 1:
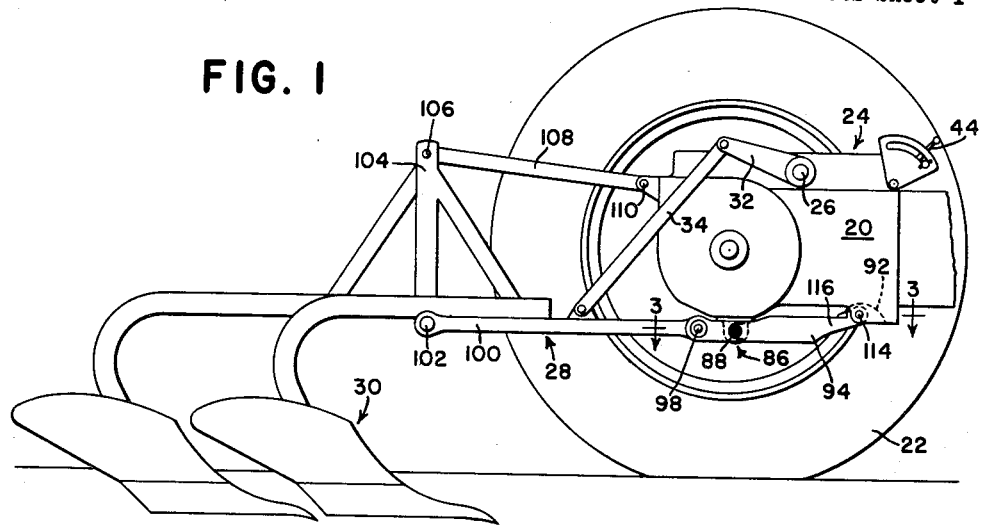
FIG. 1 is an elevation, with portions removed in the interests of clarity, of the rear portion of a tractor and connected implement.
Figure 2:
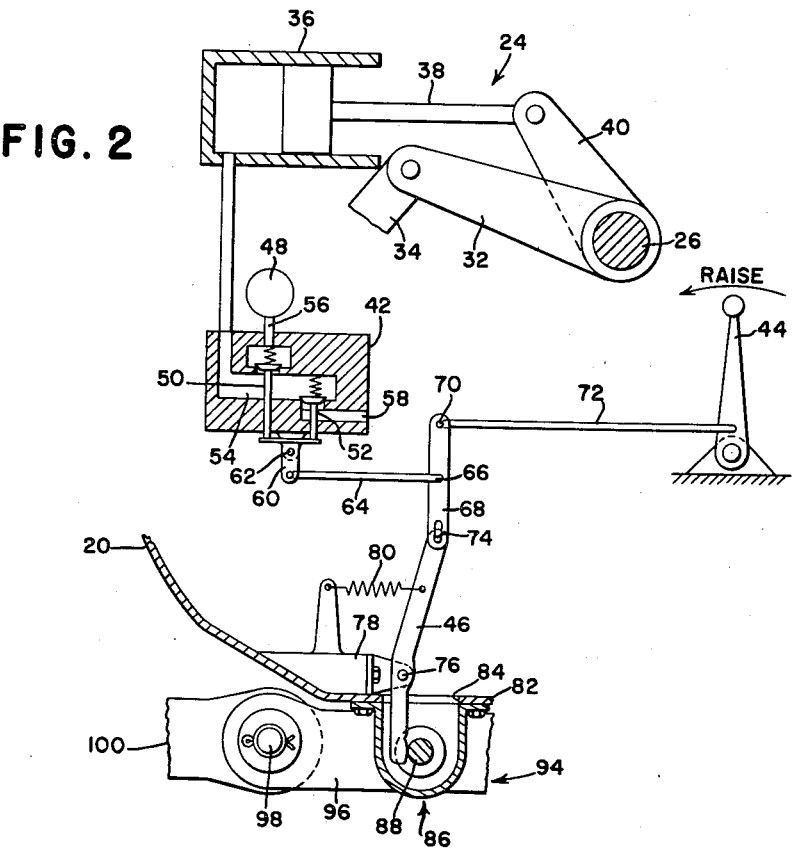
FIG. 2 is a schematic view, partly in section, showing a basic control system.
Figure 3:
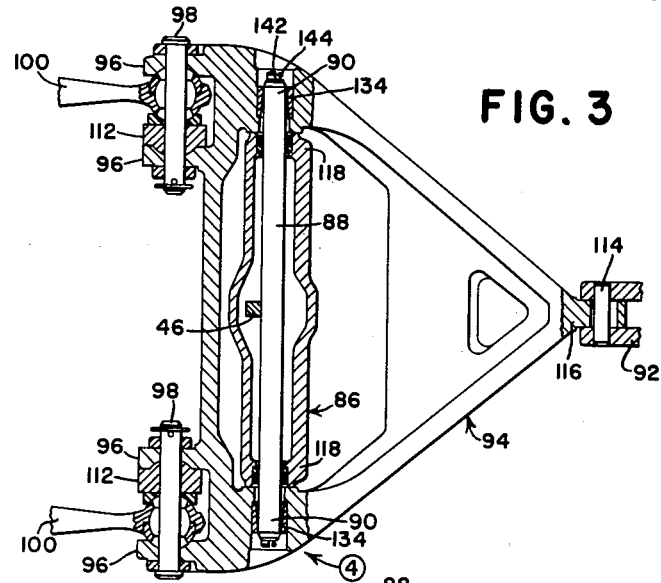
FIG. 3 is an enlarged section as seen generally along the line 3—3 of FIG. 1.

Reference will first be had to FIGS. 1, 2 and 3 for a general explanation of what is involved.

The improved control system is designed especially for use with an agricultural tractor, a rear portion of which is shown in FIG. 1 as comprising a longitudinal or fore-and-aft extending body element 20 carried on rear traction wheels, only one of which is visible at 22. As is conventional, the tractor includes a built-in power-adjusting means, designated in its entirety at 24, which powers a transverse rockshaft 26 for vertically adjusting a hitch linkage 28 to which an implement, here shown representatively as a two-bottom plow 30, is connected. The general proposition to be accepted is that the implement 30 is connected to the tractor by the hitch linkage 28 for plowing at a working depth incurring a selected draft load. Changes in the draft load will cause actuation of the hydraulic system 24 and the plowing depth will be correctively adjusted by means of lift arms 32 and lift links 34 (only one of each of which appears in the drawings) until the draft load is returned to its selected value.

As best shown in FIG. 2, the hydraulic system 24 includes a fluid motor or cylinder and piston assembly 36 having a piston rod 38 connected to an internal arm 40 keyed to the rockshaft 26. The lift arms 32 are of course external to the tractor and are connected, as already described, by the lift links 34 to the hitch or draft linkage 28. The motor 36 is under control of a valve or actuating means 42 which in turn is affected by a manually selective part, such as a hand lever 44, or a draft signal part or responder 46. Fluid pressure for the motor 36 is supplied to the valve by a conventional pump 48, here being illustrated as of the constant-pressure type; although, this is not a limitation on the invention or the applicability thereof.

The valve 42 comprises a casing, as shown, having a pair of poppet valves 50 and 52 which, in the normal position thereof, isolate a valve chamber 54 from a high pressure inlet 56 and an exhaust 58. A valve rocker 60 is pivotally mounted at 62 on the valve casing and is rockable selectively in opposite directions to forcibly open or close one or the other of the poppet valves 50 or 52. The rocker 60 is connected by a link 64 to a midpoint 66 of a lever 68, the upper end of which is pivotally connected at 70 to a link 72 which is in turn connected to the hand lever 44. The lower end of the lever 68 is connected by a pivot and slot connection 74 to the upper end of the signal part or responder 46, which itself is pivoted intermediate its ends at 76 to an appropriate support 78 on an internal portion of the tractor body 20. A light tension spring 80 normally urges the responder 46 in a counterclockwise direction about its pivot 76.

From the description thus far, and assuming that the signal part 46 is stationary, it will be seen that rearward or counterclockwise rocking of the hand lever 44 will effect raising of the linkage via rocking of the rockshaft 26 and lifting through the lift links 34. Specifically, rearward movement of the hand lever 44 transmits a force through the link 72 to rock the lever 68 counterclockwise about its pivot 74. This in turn transmits the force through the link 64 to rock the rocker 60 in a clockwise direction about its pivot 62, thus raising the poppet 50 against its spring and admitting high pressure fluid to the chamber 54. The other poppet 52, of course, remains closed and the fluid under pressure is transmitted to the rear end of the motor 36 so that the rockshaft 26 is rocked in a clockwise direction. Movement of the hand lever 44 in the opposite direction reverses the procedure just described, rocking the valve rocker 60 in a counterclockwise direction to permit the poppet valve 50 to close and elevating the poppet valve 52, whereupon fluid from the rear end of the motor is exhausted from the chamber 54 via the exhaust passage 58. As will be understood by those versed in the art, this characteristic is modified by the signal received by the system from the responder or signal part 46 according to changes in draft load between the tractor and implement as transmitted through the linkage 28. The details of one form of the inventive design will now be described.

The rear part of the tractor body 20 is here shown as a floor 82 apertured at 84 and having rigidly mounted thereon support means 86 which carries an elongated inherently resilient bar or beam 88 arranged so that it has opposite overhanging end portions 90 which, together with a depending lug means 92 on the bottom of the tractor body 20, support a draft frame or element 94.

The draft element or A-frame 94 has at its rear end at each side thereof a pair of laterally spaced apart and rearwardly extending apertured ears 96, each pair of which carries a connecting pin 98 for receiving the forward end of a proximate draft link 100, the rear end of which is pivotally connected on a transverse axis at 102 to the plow 30. The plow, as is conventional, has a rigid mast 104 to the upper end of which a pivotal connection is effected at 106 to a top link 108, the forward end of which is pivotally connected to the tractor at 110. There are, of course, two lower or draft links 100 and a single top link 108, establishing a typical three-point draft linkage supporting the plow 30 for vertical adjustment via the lift links 34 and rockshaft 26 and its arms 32. As best shown in FIG. 3, the lateral spacing of the forward ends of the draft links 100 is achieved by a pair of spacers 112, which may be respectively interchanged to the outer sides of the forward portions of the draft links to reduce the lateral spacing therebetween, this procedure being accomplished by removing the pins 98 and reassembling the forward ends of the draft links relative to their respective spacers 112, a characteristic of which is not peculiar to the present design but to which the present design lends itself because, as will hereinafter appear, variations in lateral spacing of the draft links 100 does not modify the moment arms available for stressing the beam 88 in bending. Hence, there is no variation in the load control system regardless of the spacing of the draft links.

The forward lug means 92 at the forward end of the A-frame 94 carries a cross pin 114 which receives a slotted front portion 116 of the A-frame, thus accommodating fore-and-aft movement of the A-frame element relative to the body element 20 as the overhanging ends or end portions 90 of the beam 88 are deflected when the resilient bar is stressed in bending. The lost-motion afforded at this point enables both fore-and-aft shifting of the A-frame according to whether the forces in the draft links 100 are in tension or compression. In the broader aspects of the invention, the implement-connectible draft means may be considered the draft frame 94 and/or the draft links 100; although, in its more specific phases, the invention is significant in connecting the forward ends of the draft links 100 to the frame 94 rather than directly to the overhanging ends 90 of the beam or bar 88.

Figure 4:
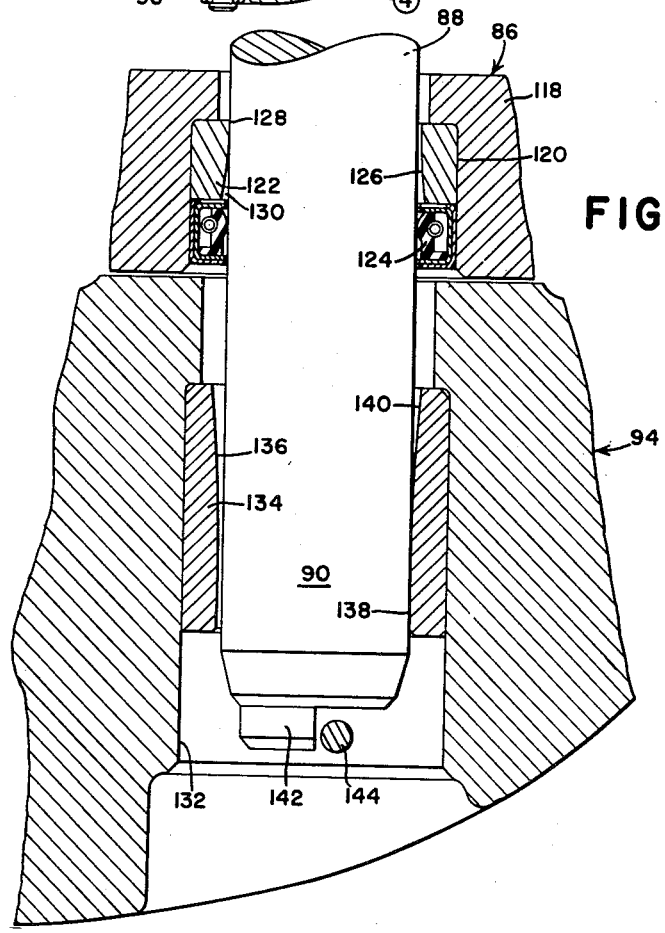
FIG. 4 is a still further enlarged fragmentary section of that portion of FIG. 3 designated by the arrow bearing the encircled numeral 4.

The mounting of the bar 88 in the support means 86 on the tractor body 20 is of particular importance, because primarily the support means is so constructed as to automatically reduce the overhang of the end portions 90 relative to the support means as the draft load increases so that responsiveness of the signal part 46 is proportional to draft load. To this end, the support means 86 has a pair of laterally spaced apart fulcrum parts 118 for supporting the bar 88 respectively short of its outer or overhanging end portions 90. The details of one fulcrum part are best shown in FIG. 4, wherein it is shown that the fulcrum part 118 is cylindrically apertured at 120 to carry an annular hardened bushing 122. The aperture 120 is appropropriately sealed adjacent the bushing by an oil and dust seal 124. The bushing 122 has a tapered or somewhat conical inner diameter 126 which, when considered as a line, is preferably a curved surface tangent to the surface of the beam 88 at a point 128 and diverging relative to the beam surface at 130 away from the beam in the direction of the deflection of the beam end portion 90 when draft load creates tensional forces in the draft links 100. In FIG. 4, it is assumed that a slight tensional force is applied through the draft links 100 to the end portions of the A-frame 94, thus engaging the bar 88 with the fulcrum part bushing 122 at what may be considered an initial fulcrum point 128. An exaggerated amount of clearance is illustrated as being present between the diametrically opposite side of the bar and the respective portion of the curved or tapered surface 126. As already described, the mounting at 92 enables fore-and-aft shifting of the A-frame, rearward shifting of which is being presently considered.

Ignoring for the moment the specific connection between the A-frame 94 and the overhanging end portions 90 of the beam 88, it will be seen that rearward movement of the A-frame 94 under draft load transmitted by the draft links 100 will tend to stress the beam 88 in bending so that the overhanging end portions 90 are deflected rearwardly about the fulcrum points 128. Thus, the portion of the beam between the fulcrum point 128 and engagement between the proximate end portion 90 with the A-frame 94 serves as a moment arm for deflecting the beam. As the end portions 90 deflect rearwardly, the midportion of the beam will be deflected forwardly. The spring 80, previously described, urges the lower part of the signal part 46 against the midportion of the beam 88 and as this midportion deflects forwardly, the lower portion of the signal part follows the beam midportion and the signal part 46 rocks counterclockwise as seen in FIG. 2, reflecting an increase in draft load which causes the lever 68 to swing clockwise about its pivotal connection 70 to the link 72. The lever 68, acting through the link 64, rocks the valve rocker 60 in a clockwise direction to elevate the inlet poppet valve 50 so that fluid under pressure is admitted to the rear end of the motor 36 for raising the implement until the draft load again reaches the selected value which here involves, of course, a reduction in draft load so that the deflected end portions 90 of the bar 88 are restored to the positions they will occupy at the selected draft load, whereupon the signal part 46 returns to normal and returns the valve 42 to neutral, again hydraulically locking the hydraulic system so that the plow operates at the depth determined by the selected draft load. In general, these results are typical of draft load control systems but, as will be brought out below, are modified by the improved design.

If the fulcrum point 128 were the only point about which the end portion 90 of the beam 88 is deflected, the moment arm on the beam would be constant and the amount of deflection of the end portion would be the same at light loads as at heavy loads. Stated otherwise, the control system would have the same sensitivity regardless of load. However, according to the present invention, the moment arm is automatically reduced at increasing loads so that, for example, a five hundred pound change in the load in a high range will produce a smaller change in responsiveness of the system than a five hundred pound load change would produce at a lighter load or a load in a lower range. In a commercial embodiment of the present invention, and as an example only, a change in draft load from one thousand to fifteen hundred pounds incurs a deflection at the midpoint of the beam 88 of .012 inch, whereas a change in load from fifty-five hundred to six thousand pounds incurs a deflection of .006 inch. As previously indicated generally, this characteristic is desirable because it makes sensitivity variable and tends to make the signal to the hydraulic system proportional to the draft load.

Stated otherwise, the fulcrum point does not remain at 128 but changes infinitely along the surface 126 as the end portion 90 deflects, thus setting up an infinite number of new fulcrum points, particularly since the surface is curved rather than a straight line. It is, of course within the scope of the invention to utilize a fulcrum support, as at 118—122, to establish a fixed number of different fulcrum points. Since the fulcrum involving the fulcrum bushing 122 is annular, it is symmetrical relative to the major axis of the beam 88 and the same results are accomplished when draft load changes so that the draft element 94 is shifted forwardly, as when the draft links 100 are placed in compression. The lug means 92 that supports the front end of the draft frame element 94 permits an adequate amount of forward shifting of the A-frame relative to the body.

Further augmenting the characteristics just described is improved means connecting the A-frame 94 to the overhanging end portions 90, these means may be considered a second connecting means, regarding the fulcrum parts 118 as first connecting means. Here again, the principle of an automatically shifting fulcrum is employed, which is achieved at each side of the A-frame 94 by providing in that side of the A-frame an aperture 132 which is fitted with a bushing 134 having an internal surface 136 comparable to the surface 126 of the bushing 122. The initial point of contact between the overhanging end portion 90 of the bar 88 and the bushing 134 when the A-frame shifts rearwardly is at a fulcrum point 138 tangent to the front surface of the beam, and the surface diverges inwardly at 140 and in a direction opposite to the direction of deflection of the end portion 90. Thus, the effective moment arm acting to deflect the end portion 90 is measured between the inner and outer or first and second points 128 and 138, the former being considered a fulcrum point and the latter a load point. As the end portion 90 deflects rearwardly, the fulcrum point shifts automatically outwardly, as already described, and the load point shifts inwardly from 138 along the curved surface 136. In a preferred construction, in which the initial moment arm between the points 128 and 138 is on the order of three inches, a desirable curvature of the surface 126 for the fulcrum bushing 122 may be on the order of a six to seven inch radius, and the radius of the surface 136 for the load bushing 134 may be on the order of 32 inches; although, these dimensions are of course variable according to the dimensional and material characteristics of the structure and the draft loads expected to be encountered. Therefore, the characteristics just referred to are given by way of example only and are not intended in any way to limit the applicability of the invention or the scope thereof.

Endwise displacement and rotation of the beam 88 relative to the structure to which it is connected and by which it is supported are prevented by notching the ends of the beam at 142 and using cross pins 144, the latter permitting sufficient lost-motion to accommodate changes in position of the draft element 94 relative to the body 20 when the end portions 90 are deflected.

The slot or elongated opening in the A-frame front portion 116 enables fore-and-aft lost-motion as stated and further affords front and rear stops for engaging the pin 114 and thus limiting said motion to a predetermined range.

It will be seen from the foregoing that the function produced by the structure, relative to reduction of the overhang of the end portions 90, may be stated in various ways, one of which has already been stated as means for automatically reducing the overhang relative to the support means fulcrum parts 118 as the draft load increases so that responsiveness of the signal part 46 is proportional to draft load. Since the moment arms are shortened as draft load increases, the resistance of the bar to deflection is automatically increased. Further, although the fulcrum bushing 122 and the load bushing 134 are used as companions, it will be clear that either could be used by itself, in which the moment arm or overhang would be reduced according to the characteristic of the particular bushing. In the present case, the reduction and overhang is multiplied by the characteristics of the two bushings. Likewise, as will be clear from the ensuing description of modified forms of the invention, the same results may be otherwise accomplished, even in addition to the modifications about to be described.

In the modified form of the invention shown in FIGS. 5 through 10, parts corresponding to but different from those already described, are identified by the same reference characters but supplied with the exponent "a." Accordingly, the modification includes a draft or A-frame element 94a, mounted on the tractor by means of the lug means 92, the cross pin 114 and an A-frame forward portion 116a, in addition to being supported at its rear by a beam or bar 88a similar to that previously described at 88. The element 94a has rearwardly projecting apertured ears 96a for connection of the draft links 100 by means of the connecting pivot pins 98. The support means is shown at 86a, replacing that previously described at 86. The bar 88a has overhanging end portions 90a and the midportion of the bar is related to the signal member 46 just like the midportion of the bar 88. The support means 86a includes laterally spaced apart fulcrum parts 118a beyond which the end portions 90a of the bar respectively overhang to be engaged by load-transmitting parts or bushings 134a which are received respectively in apertures 132a in side portions of the element 94a. The bushings at 118a and 134a appear as plain bushings but they may of course be similar to those previously described at 118 and 134. In general, the element 94a is mounted for fore-and-aft shifting by the support means 86a, bar 88a, and front lug means 92, the draft load being transmitted thereto via the draft links 100 so that the end portions 90a of the bar 88a are deflected according to the draft load.

In the description of FIGS. 1 through 4, it was noted as a characteristic thereof that the resistance to deflection was increased because the moment arms on the overhanging portions 90 were reduced. In FIGS. 5 through 10, additional resistance is supplied by a second resilient means, here a second elongated inherently resilient bar or beam 89, the midportion of which is carried by the support means 86a via an extension 91 which serves as a fulcrum, the bar 89 thus having overhanging end portions 93 which respectively engage opposite sides of the A-frame 94a via load-transmitting parts in the form of bushings 95. Each end of the bar 89 has a terminal eccentric portion 97; that is, each portion 97 is eccentric to the major axis of the bar 89, the bar in this case being preferably of circular cross-section. In the position of the eccentric portions 97 in FIG. 5, the forward edges of these portions are clear of the respective bushings 95, so that it will require a predetermined amount of rearward shifting of the frame element 94a via increased draft load creating tension in the draft links 100 before the bushings 95 engage the respective portions 97. Hence, at predetermined initial loads, resistance to the rearward shifting of the draft frame element 94a via the draft links 100 is set up solely by the bar 88a. After this initial load is exceeded, the resistance of the bar 89 is interposed, because at this time the load-transmitting parts or bushings 95 will engage the bar portions 97.

It is a feature of this form of the invention that the bar 89 is rotatable in the support 91 about its major axis and selected angular positions thereof are maintained by a releasable lock, here in the form of a pin 99 selectively receivable in two positions in a fore-and-aft aperture 101 in the element 94a or a pair of alined vertical apertures 103, also in the element 94a. FIG. 7 illustrates a position of the bar 89 180° from the position of FIG. 5, in which case the pin 99 has been withdrawn, the bar rotated 180°, and the pin reinserted. The nature of this adjustment provides immediate contact between the bushing 95 and the bar so that initial resistance of the draft frame element 94a to shifting is established by the two bars 88a and 89 in unison, when draft load is applied as tension in the draft links 100. However, when draft load is measured as compressional forces, resistance is set up initially by the bar 88a and subsequently picks up the bar 89, because the clearance is at the rear side of the bar rather than at the front side as in FIG. 5.

FIGS. 9 and 10 show the third position of the bar, which is 90° intermediate the two already described, in which case the pin 99 utilizes the registering apertures 103. Thus, the clearance at both the front and rear sides of the bar is the same and the resistance afforded by the bar 89 is secondary to that afforded by the bar 88a in either direction of shifting of the frame element 94a.

Thus, the arrangement shown in FIGS. 5 through 10 operates at times as an additional resilient element on the tractor and having a lost-motion connection with the draft-connectible means 94a etc., which is effective to oppose the draft load on a predetermined amount of deflection of the overhanging portions of the bar 88a. When the lost-motion situation of FIGS. 5 or 7 obtains, the additive effect of the bar 89 is incurred automatically upon a predetermined increase in draft load. It will be clear of course that the lost-motion may be set into the system at either side of the bar end portions 97 or may be split between both sides (FIGS. 9 and 10). When the two biasing means 88a and 89 are considered as one, it will be seen that the effectiveness thereof can be varied by modifying the effectiveness of the bar 89, thus varying the resistance of the biasing means to shifting of the draft element. In its broadest aspects, the particular connection between the draft links and the draft frame element is not considered as a limiting factor, because, if desired, the draft links could be connected directly to the bars 88a and 89 in any desired manner; although, the connecting means illustrated affords certain advantages, as already outlined.

That form of the invention shown in FIG. 11 is a modified version of that shown in FIGS. 1 through 4, and again the employment of similar reference characters, here bearing the exponent "b," will be resorted to. It will thus be seen that a draft frame element 94b is mounted on the tractor body by the lug means 92, having the cross pin 114 for engaging the forward end 116b of the A-frame 94b.

The tractor has a modified form of support means 86b which, through the medium of a beam or bar 88b, supports the rear portion of the A-frame element 94b. The intermediate portion of the support means 86b carries a central fulcrum portion 118b which is in the form of a pair of curved surfaces 126b forming similar parts of an arc at opposite sides of the fore-and-aft center line of the element 94b, which arc normally has a point of tangency 128b with the rear side of the bar 88b, the surfaces diverging oppositely at 130b. The element 94 is apertured coaxially at opposite sides thereof at 132b to receive opposite overhanging end portions 90b of the bar 88b, the apertures being sufficiently large to afford clearance between the element and the bar. Contact between the element and the bar is established by a pair of upright pins 134b received respectively in appropriate slots in the ends of the bar. The pins 134b thus establish load-transmitting connections between the element 94b and the bar 88b and draft load applied tensionally to the element 94b via the draft links 100, which are connected to the draft frame via lugs 96b and the pins 98, is resisted by the bar 88b, the overhanging end portions 90b of which deflect rearwardly about the fulcrum 118b. Again, the principle of automatically decreasing the moment arms as the draft load increases is exploited, here as the bar engages the surfaces 126b to take up the clearances at 130b, again the fulcrum points shifting laterally outwardly respectively from the fore-and-aft center line. When draft load is measured in compressional forces applied to the draft links 100, the bar 88b is bent in the opposite direction about a fulcrum pin 122b carried by the tractor. It will be understood, of course, that the pin 122b could be replaced with an arcuate fulcrum similar to that at 118b. However, forward shifting of the element 94b in response to compressional draft loads is encountered infrequently and when encountered is of relatively minor magnitude. Hence, in the interests of economy, the fulcrum pin 122b is illustrated. On the other hand, the frequency of occurrence of compression is sufficient to merit recognition and in a system designed to enjoy superior advantages over other systems, provision should be made for reflecting both tensional and compressional loads.

In the instances of FIGS. 1 through 4 and 5 through 10, the midportion of the bar 88 (or 88a) was employed to transmit the signal to the signal part 46. In FIG. 11, the signal transmission is accomplished by a fore-and-aft pin 146 carried by a transverse rear portion 148 of the element 94b and extending forwardly to engage the lower portion of the signal part 46. However, since the direction of motion will be reversed, appropriate modification of the signal part 46 or its connection to the lever 68 must be made. Since this is within the ability of one skilled in the art, the details are not illustrated. As will be clear, the characteristics of FIGS. 1 through 10 are otherwise present in FIG. 11.

In the modification shown in FIG. 12, similarities will be readily apparent, and again the use of similar reference characters, this time supplied with the exponent "c," is indulged. A draft frame element or A-frame 94c is mounted on the tractor by means of the lug means 92 and a support means 86c. The forward portion of the A-frame 94c is, at 116c, designed to receive the cross pin 114 to establish the necessary lost-motion connection. The rear part of the element 94c has draft-link-receivable lugs 96c to which the draft links 100 are connected by the pins 98. The support means 86c includes lateral extensions 150 for supporting the element 94c in a horizontal plane and for fore-and-aft shifting, which motion is opposed by biasing means comprising an outer relatively heavy spring 89c and an internal relatively lighter spring 88c. Transmission of the signal from the element 94c to the signal part 46 is via a pin 146c carried by a cross part 148c of the element 94c, substantially duplicating the construction of FIG. 11. Again, the motion system must be modified because the direction is opposite to that of FIG. 5. In the starting position of the element 94c as appearing in FIG. 12, the forward end of the heavy spring 89c is out of contact with a forward spring seat 152 on a central part of the element, whereas the forward end of the light spring is in contact with the seat. Therefore, initial rearward shifting of the element is opposed by only the light spring 88c and, after the light spring has been taken up to the extent represented by the clearance 154, the spring 89c is picked up. Therefore, as in the case of FIG. 5, the biasing means includes a first portion 88c initially resisting rearward shifting of the element, plus a second portion which subsequently additively resists rearward shifting of the element. In general, duplication of the results available in FIG. 5 will be readily apparent in FIG. 12.

The operational characteristics of the system have been described in connection with the basic structure and require no elaboration. The same is true of the advantageous and novel features of all forms of the invention. Features and advantages other than those categorically enumerated will readily occur to those versed in the art, as will many modifications and alterations in the preferred embodiments illustrated, all of which may be achieved without departure from the spirit and scope of the invention.

What is claimed is:

1. For a tractor having power adjusting means for an associated implement and actuating means for activating and deactivating the power adjusting means: draft load control means comprising an elongated inherently resilient beam; support means mounting the beam on the tractor and engaging the beam at one portion and leaving another portion of the beam extending in overhanging relation to said support means; implement-connectible draft means connected to said overhanging portion for applying draft load to said overhanging portion to cause same to deflect relative to said one portion; movable signal means connected to the actuating means and engageable with the beam to effectuate said actuating means responsive to deflection of said overhanging portion; and means for automatically increasing the resistance of said overhanging portion to deflection as the draft load increases so that responsiveness of the signal part is proportional to draft load, said last-named means comprising an additional resilient element, means mounting said element on the tractor, and a lost-motion connection between said element and the draft-connectible means effective to oppose the draft load upon a predetermined amount of deflection of said overhanging portion.

2. The invention defined in claim 1, in which: said element comprises an inherently resilient beam substantially parallel to the first named beam.

3. For a tractor having power adjusting means for an associated implement and actuating means for activating and deactivating the power adjusting means: draft load control means comprising an elongated inherently resilient beam; support means mounting the beam on the tractor and engaging the beam at one portion and leaving another portion of the beam extending in overhanging relation to said support means; implement-connectible draft means connected to said overhanging portion for applying draft load to said overhanging portion to cause same to deflect relative to said one portion; movable signal means connected to the actuating means and engageable with the beam to effectuate said actuating means responsive to deflection of said overhanging portion; and means for varying the resistance of said overhanging portion to deflection by draft load, said last named means including a second beam generally parallel to the first-mentioned beam and having a connection to the tractor and a connection to the draft means, one of said connections including a lost-motion device enabling preliminary deflection of the overhanging portion of the first mentioned beam and subsequent additive deflection of a portion of said second beam, said device being adjustable to vary the degree of lost-motion and thus to vary the time when said second beam portion is deflected.

4. For a tractor having power adjusting means for an associated implement and actuating means for activating and deactivating the power adjusting means: draft load control means comprising an elongated inherently resilient beam; support means mounting the beam on the tractor and engaging the beam at one portion and leaving another portion of the beam extending in overhanging relation to said support means; implement-connectible draft means connected to said overhanging portion for applying draft load to said overhanging portion to cause same to deflect relative to said one portion; a movable signal means connected to the actuating means and engageable with the beam to effectuate said actuating means responsive to deflection of said overhanging portion; and means for varying the resistance of said overhanging portion to deflection by draft load, said last named means including a second beam generally parallel to the first-mentioned beam and having a connection to the tractor and a connection to the draft means, one of said connections including a deflectible portion of said second beam eccentric to the major axis of said beam, said eccentricity enabling independent preliminary deflection of the overhanging end portion of the first mentioned beam by draft load and subsequent additive deflection of said second beam deflectible portion upon increase in draft load, said second beam being angularly adjustable about its major axis to vary the position of said second beam deflectible portion relative to said one connection and thus to vary the time when said second beam portion is deflected.

5. In a tractor having a longitudinal body element, the combination therewith of a draft element having laterally spaced apart portions; means mounting the draft element on and for longitudinal shifting relative to the body element in at least one direction away from a certain position; a pair of draft links connected to said portions for applying draft load to the draft element to incur shifting thereof in said one direction; first biasing means interposed between the elements and offering resistance to shifting of said draft element in said one direction under draft load; and second biasing means interposed between said elements and effective upon predetermined shifting of the draft element in said one direction against the resistance of the first biasing means to additively resist said shifting, said first biasing means comprising a first inherently resilient beam having a first portion engaging the body element and a second portion spaced from said first portion lengthwise of the beam and engaging the draft element for stressing of the beam in bending in response to draft load; and said second biasing means likewise comprising an inherently resilient beam having first and second portions spaced apart lengthwise of said second beam, one of said second beam portions engaging one element and the other second beam portion having delayed engagement with the other element so that said second beam is stressed in bending subsequent to a predetermined amount of bending of the first beam in response to draft load on the draft element.

6. In a tractor having a body, the combination therewith of a first support on the body; a first inherently resilient beam carried by the support and having a beam portion extending from said support in overhanging relation thereto for receiving draft loads to stress the beam in bending; a draft element mounted on the tractor body to shift transverse to the length of the beam and engaging the overhanging portion of the beam; draft receivable means on the element for receiving draft load to deflect said overhanging portion; a second support on the tractor body; a second inherently resilient beam carried by the second support and having a beam portion extending in overhanging relation to said second support; and means on said second beam overhanging portion engageable with the draft element to add the resistance of said second beam in bending to that of the first beam.

7. In a tractor having a body, the combination therewith of a first support on the body; a first inherently resilient beam carried by the support and having a beam portion extending from said support in overhanging relation thereto for receiving draft loads to stress the beam in bending; a draft element mounted on the tractor body to shift transverse to the length of the beam and engaging the overhanging portion of the beam; draft receivable means on the element for receiving draft load to deflect said overhanging portion; a second support on the tractor body; a second inherently resilient beam carried by the second support and having a beam portion extending in overhanging relation to said second support and into proximity to the draft element; means on the draft element for receiving the second beam overhanging portion and including a draft-element-carried part engageable with said second beam overhanging portion to deflect the latter upon shifting of the element whereby to add the resistance of said second beam of said second beam in bending to that of the first beam; and means for relatively adjusting the second beam overhanging portion and the draft-element carried part for varying the time of engagement between the two.

8. In a tractor having a body, the combination therewith of a first support on the body; a first inherently resilient beam carried by the support and having a beam portion extending from said support in overhanging relation thereto for receiving draft loads to stress the beam in bending; a draft element mounted on the tractor body to shift transverse to the length of the beam and engaging the overhanging portion of the beam; draft receivable means on the element for receiving draft load to deflect said overhanging portion; a second support on the tractor body; a second inherently resilient beam carried by the second support and having a beam portion extending in overhanging relation to said second support and into proximity to the draft element; means on the draft element for receiving the second beam overhanging portion and including a draft-element-carried part engageable with said second beam overhanging portion to deflect the latter upon shifting of the element whereby to add the resistance of said second beam in bending to that of the first beam; said second beam overhanging portion being eccentric to the major axis of the second beam; and said second beam being angularly adjustable about its said major axis to vary the relationship between said second beam overhanging portion and said draft-element-carried part and thereby to vary the time of engagement between the two.

References Cited in the file of this patent

UNITED STATES PATENTS 2,940,530     Du Shane _____ June 14, 1960